United States Patent
Sung et al.

(10) Patent No.: US 6,822,902 B2
(45) Date of Patent: Nov. 23, 2004

(54) APPARATUS AND METHOD FOR INTERFACING BETWEEN MODEM AND MEMORY IN MOBILE STATION

(75) Inventors: Weon-Yong Sung, Kyongsangnam-do (KR); In-Kwon Paik, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 186 days.

(21) Appl. No.: 10/225,113

(22) Filed: Aug. 20, 2002

(65) Prior Publication Data

US 2003/0035320 A1 Feb. 20, 2003

(30) Foreign Application Priority Data

Aug. 20, 2001 (KR) .......................................... 2001-50012
Jun. 17, 2002 (KR) .......................................... 2002-33697

(51) Int. Cl.$^7$ .............................................. G11C 16/04
(52) U.S. Cl. ............................. 365/185.17; 365/185.33
(58) Field of Search ....................... 365/185.17, 185.33, 365/185.09, 185.11

(56) References Cited

U.S. PATENT DOCUMENTS 5,815,426 A * 9/1998 Jigour et al. ................... 365/51
6,125,061 A * 9/2000 Mitani .................... 365/185.33
6,363,009 B1 * 3/2002 Fukuzumi .............. 365/185.03

* cited by examiner

Primary Examiner—Anh Phung
(74) Attorney, Agent, or Firm—Dilworth & Barrese LLP

(57) ABSTRACT

An internal data processing apparatus and method in a mobile station. A NOR flash memory is replaced with a NAND flash memory as a memory for storing internal data, and a modem is interfaced with the NAND flash memory.

9 Claims, 9 Drawing Sheets

APPARATUS AND METHOD FOR INTERFACING BETWEEN MODEM AND MEMORY IN MOBILE STATION

PRIORITY

This application claims priority to an application entitled "Apparatus and Method for Interfacing between Modem and Memory in Mobile Station" filed in the Korean Industrial Property Office on Aug. 20, 2001 and assigned Serial No. 2001-50012, and to an application entitled "Apparatus and Method for Interfacing between Modem and Memory in Mobile Station" filed in the Korean Industrial Property Office on Jun. 17, 2002 and assigned Serial No. 2002-33697, the contents of both of which are hereby incorporated by reference.

BACKGROUND OF THE INVENTION

1. Field of the Invention

The present invention relates generally to an apparatus and method for processing internal data in a mobile station (MS), and in particular, to an apparatus and method for interfacing between a modem and a memory.

2. Description of the Related Art

An MS serviced only voice calls in its earlier stage of development and now supports a variety of services including data service along with users' growing demands and the advance of communication technology. The various services are a text service, a graphic service, E-mail, voice mail, navigation, transmission of moving pictures, etc.

The MS is provided with a modem to process data received and data to be transmitted over a wireless network. The modem is usually implemented in the form of a chip and the modem chip is essential to driving the MS. The MS is also provided with a memory for storing data from the above services and information required to operate the MS. Therefore, the MS needs an apparatus for interfacing the modem and the memory to provide the above services.

A conventional MS uses a NOR flash memory for storing application programs and OS (Operating System) codes. An interfacing structure between interfacing data between a modem and a memory in an MS using a NOR Flash memory is illustrated in FIG. 1.

Referring to FIG. 1, a chip select signal ROM_CSB, a read enable signal RDB, a write enable signal WRB, an address signal A, and a data signal D are used to interface data between a modem 110 and a NOR flash memory 112. A chip select signal (RAM_CSB) is additionally used to interface between the modem 110 and a working memory 114.

Referring to FIG. 1, the modem 110 processes data received or data to be transmitted over a wireless network. Upon generation of data for data transmission/reception over the wireless network, the modem 110 also stores the data in a NOR flash memory 112. The modem 110 reads data for transmission over the wireless network from the NOR flash memory 112. When the MS is powered-on, the modem 110 accesses basic codes required for initialization, such as boot codes, a vector table, and load codes through the NOR flash memory 112. The NOR flash memory 112 stores application programs and OS codes needed in the MS. The working memory 114 temporarily stores application programs required for the modem 110 to process predetermined data and provide a particular service, and can be accessed when necessary. The working memory 114 can be, for example, an SRAM or an UtRAM. For example, after the initialization of the MS, the modem 110 reads the OS codes and a call software from the NOR flash memory 112 and copies them in the working memory 114. Then the modem 110 accesses the working memory 114. The reason for copying data from the NOR flash memory 112 to the working memory 114 is that data can be accessed more rapidly in the working memory 114 due to a short access time of the SRAM used as the working memory 114. The modem 110 reads or writes application data directly from or into the NOR flash memory 112. When necessary, the modem 110 copies the application data in the working memory 114.

To write data in the NOR flash memory 112, the modem 110 enables the NOR flash memory 112 by the chip select signal ROM_CSB, designates a predetermined address by the address signal A during enabling the write enable signal WRB, and provides data to the NOR flash memory 112 by the data signal D at the same time. The NOR flash memory 112 is enabled by the chip select signal ROM_CSB and upon receipt of the address signal A and the data signal D for the period of enabling the write enable signal WRB, it stores the data represented by the data signal D in an area designated by the address signal A.

To read data from the NOR flash memory 112, the modem 110 enables the NOR flash memory 112 by the chip select signal ROM_CSB and receives the data signal D from the NOR flash memory 112 by the address signal A during enabling of the read enable signal RDB. The NOR flash memory 112 is enabled by the chip select signal ROM_CSB, reads data from a memory area designated by the address signal A received from the modem 110 during enabling of the read enable signal RDB, and transmits the data signal D to the modem 110.

To write data in the working memory 114, the modem 110 enables the working memory 114 by the chip select signal RAM_CSB and upon receipt of the address signal A and the data signal D during enabling the write enable signal WRB, it stores the data signal D representing data in a memory area designated by the address signal A.

To read data from the working memory 114, the modem 110 enables the working memory 114 by the chip select signal RAM_CSB and receives the data signal D from the working memory 114 by the address signal A during enabling the read enable signal RDB. The working memory 114 is enabled by the chip select signal RAM_CSB, reads data from a memory area designated by the address signal A during enabling of the read enable signal RDB, and transmits the data signal D to the modem 110.

A memory capacity of 16 or 32 Mbit is sufficient for services provided from an MS at present. However, considering the rapid growth of the communications market, various MS services, advanced functions, high capacity, and the resulting increase in data file size, a memory capacity requirement is 64/128 Mbit or larger.

It is impossible to provide inexpensive NOR flash memories with an increased memory speed requirement in view of its structure. Moreover, the drastically growing demands for NOR flash memories add to the difficulty with supplying parts for manufacture of NOR flash memories. In this context, NAND flash memories may become more widely used as memories for MSs because they can be provided at cheap prices.

In a comparison between a NOR flash memory and a NAND flash memory with the same capacity, the former is 3.56 dollars per mega byte and the latter is 0.83 dollars per mega byte. It is expected that the NOR flash memory and the NAND flash memory will be 3.06 and 0.6 dollars, respectively in 2002.

In terms of density, a NAND flash memory of 512 Mbit corresponds to a 64-Mbit NOR flash memory is. In 2002, a NAND flash memory of 1024 Mbit will correspond to a 128-Mbit NOR flash memory.

It can therefore be concluded that the NAND flash memory is better than the NOR flash memory in terms of cost and density. Therefore, NOR flash memories have reached their limits of use in MSs.

SUMMARY OF THE INVENTION

It is, therefore, an object of the present invention to provide an MS using a NAND flash memory.

It is another object of the present invention to provide an apparatus and method for interfacing data between a modem and a NAND flash memory in an MS.

To achieve the above and other objects, there are provided an apparatus and method for interfacing data between a modem and a NAND flash memory in an MS. In an interface circuit between the NAND flash memory and the modem, a working memory has a capacity smaller than the capacity of the NAND flash memory, copies part of the information stored in the NAND flash memory therein, has second addresses different from the first addresses of the NAND flash memory. A programmable memory has basic codes required to copy the part of the information stored in the NAND flash memory to the working memory. A controller is connected to the programmable memory, for controlling random reading of the information stored in the working memory using the second addresses.

To write data in the NAND flash memory, a write command is transmitted to the NAND flash memory by enabling a second chip select signal for activating the NAND flash memory and a command latch enable signal when the modem enables a first chip select signal and the write command. A write address is transmitted to the NAND flash memory by disabling the command latch enable signal and enabling an address latch enable signal and writing data from the modem in the NAND flash memory. An error correction code for the data is generated in an error correction code generator by disabling the address latch enable signal and a third chip select signal. The error correction code is transmitted to the NAND flash memory by disabling the third chip select signal and enabling the second chip select signal for activating the NAND flash memory, and written in the NAND flash memory. Then, the second chip select signal is disabled.

To read data from the NAND flash memory, a read command is transmitted to the NAND flash memory by enabling a second chip select signal for activating the NAND flash memory and a command latch enable signal when the modem enables a first chip select signal and the read command. A read address is transmitted to the NAND flash memory by disabling the command latch enable signal and enabling an address latch enable signal, and data at the read address and an error correction code for the data is read. An error correction code for the data is generated in the error correction code generator by disabling the address latch enable signal and a third chip select signal. When the third chip select signal is disabled, it is determined whether the read data has errors by comparing the read error correction code with the generated error correction code. If it is determined that the read data has errors, the errors are corrected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In order to replace a NOR flash memory with a NAND flash memory according to the present invention the following aspects are generally addressed.

(1) When an MS is initially power-on, a modem randomly accesses basic codes including a vector table, boot codes, and load codes for initialization. In the case of a conventional NOR flash memory, it does not matter that the basic codes are in the NOR flash memory allowing random access. However, since a NAND flash memory according to the present invention does not allow random access, a device for allowing random access to the basic codes is required (2) A NAND flash memory controller is required, which controls the NAND flash memory according to a command from the modem and reports the control status of the NAND flash memory to thereby enable the modem to access the NAND flash memory.

Figure 1:
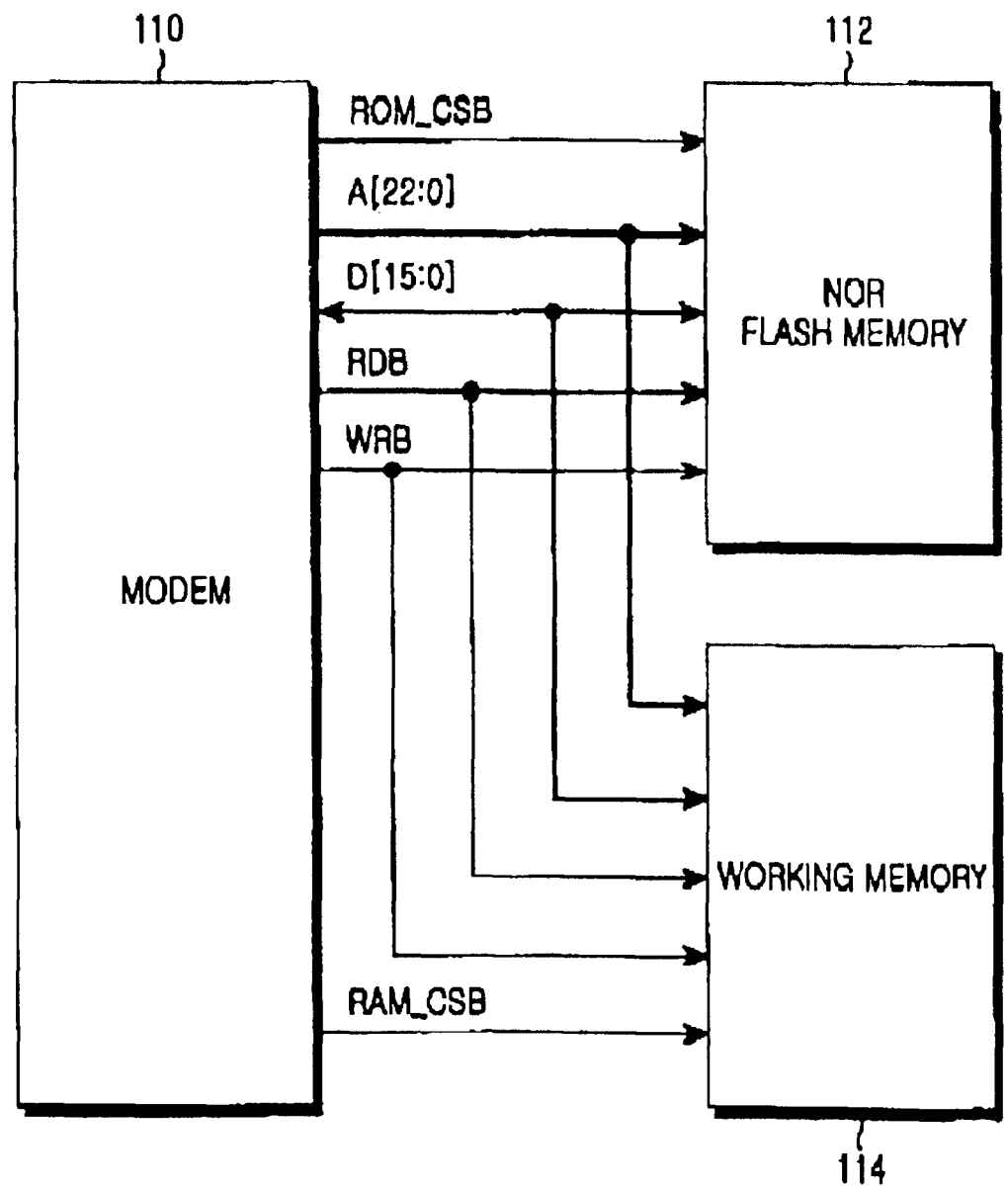
FIG. 1 is a block diagram of a conventional apparatus for interfacing between a modem and memories in an MS.
Figure 2:
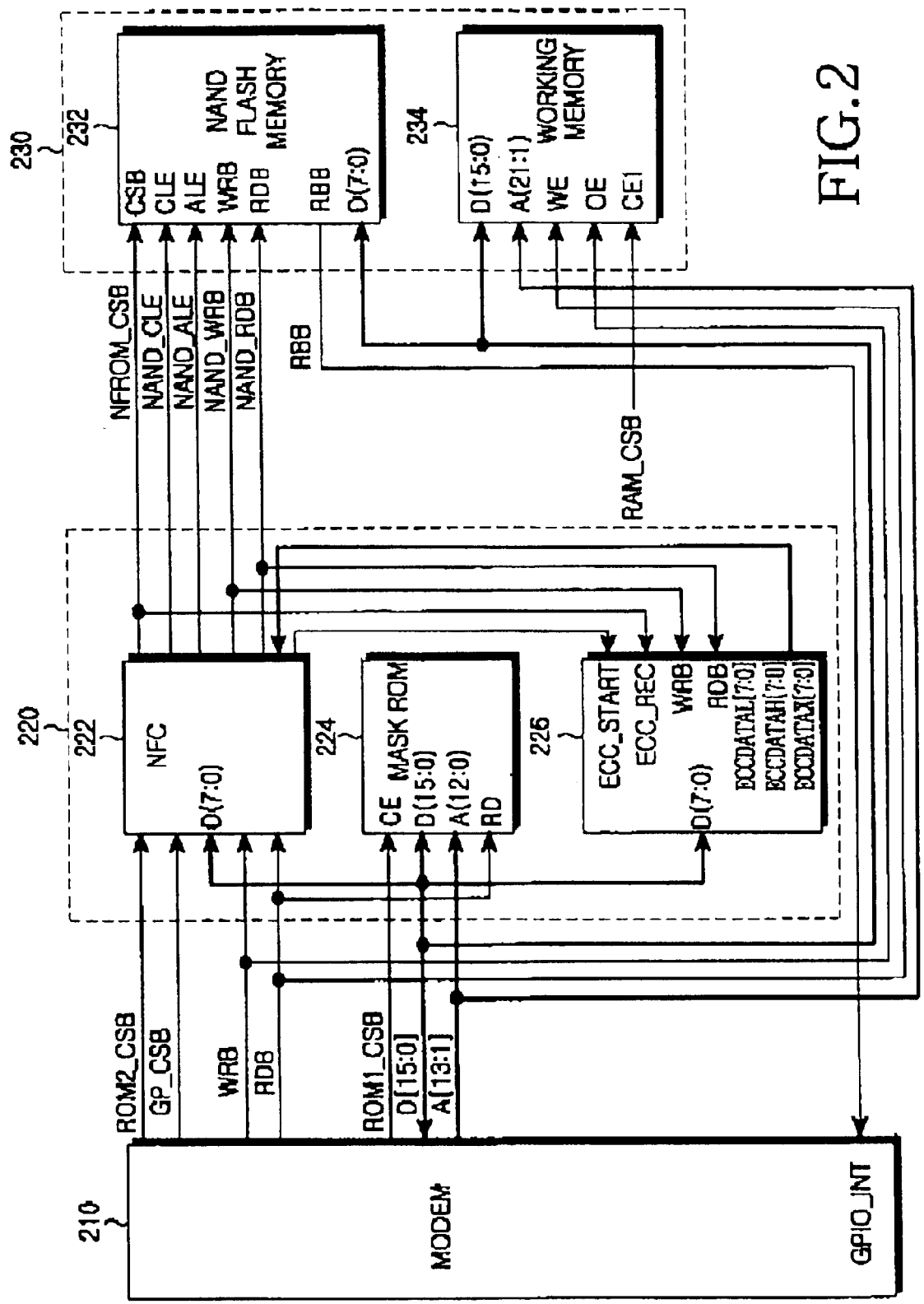
FIG. 2 is a block diagram of an apparatus for interfacing between a modem and a memory unit in an MS according to an embodiment of the present invention.

FIG. 2 illustrates an apparatus for interfacing between a modem and a memory unit according to an embodiment of the present invention, which satisfies the above aspects. As illustrated, the interfacing apparatus is comprised of a modem 210, a memory unit 230, and an interface 220 for interfacing between the modem 210 and the memory unit 230.

Referring to FIG. 2, the interface 220 includes an NFC 222, a mask ROM (Read Only Memory) 224, and an error correction code (ECC) generator 226. The modem 210 can access the mask ROM 224 randomly. Therefore, the mask ROM 224 stores basic data required for initialization, such as a vector table, boot codes, and load codes, thereby obviating the need for a NOR flash memory or refresh. The basic data of mask ROM 224 is program data by which data is copied from a NAND flash memory 232 to a working memory 234.

The ECC generator 226 receives data transmitted between the modem 210 and the memory unit 230 and generates a parity code ECCDATAL[7:0], ECCDATAH[7:0], and ECCDATAX[7:0] for the input data. The parity code is used for bit error check and correction in the modem 210. The mask ROM 224 is enabled by a chip select signal ROM1_CSB from the modem 210 and outputs data D[15:0] to the modem 210 according to an address signal A[13:1]. The NFC 222 controls the memory unit 230 so that the modem 210 can write or read data in or from the memory unit 230. That is, the NFC 220 controls the memory unit 230 by signals NFROM_CSB, CLE, ALE, NAND_WRB, and NAND_RDB according to commands ROM2_CSB, GP_CSB, WRB and RDB received from the modem 210. These signals and commands are described further below. The NFC 220 also reports the current control status of the memory unit 230 to the modem 210 and transmits a parity code generated from the ECC generator 226 to the modem 210.

The memory unit 230 includes the NAND flash memory 232 and the working memory 234. The NAND flash memory 232 writes or reads data under the control of the NFC 222. The working memory 234 temporarily stores data received from the modem 210 to allow fast data access for the modem 210.

Now, signals related with the interface 220 will be defined below.

With regard to signals input to the interface 220, ROM1_CSB is a chip select signal that enables the mask ROM 224. ROM2_CSB is a chip select signal input to the NFC 222 that is enabled when the NFC 222 accesses the ECC generator 226, the NAND flash memory 232, or the working memory 234. GP_CSB is a chip select signal input to the NFC 222 and enabled when the NFC 222 accesses the ECC generator 226 or the NAND flash memory 232. A[13:1] is an address bus signal. RDB is enabled for the modem 210 to read data from the NAND flash memory 230, the working memory 234, the ECC generator 226, or the NFC 222. WRB is enabled for the modem 210 to write data in the NAND flash memory 230, the working memory 234, the ECC generator 226, or the NFC 222. D[15:0] is a data bus signal.

With regard to signals output from the interface 220, ALE (Address Latch Enable Signal) is enabled to write an address in a data bus when the NAND flash memory 232 is accessed. CLE (Command Latch Enable Signal) is enabled to write a command in the data bus when the NAND flash memory 232 is accessed. The command can be defined according to the NAND flash memory 232. NFROM_CSB is a chip select signal enabled for the NFC 222 to access the NAND flash memory 232. NAND_WRB is enabled when the NFC 222 writes data in the NAND flash memory 232. NAND_RDB is enabled when the NFC 222 reads data from the NAND flash memory 232.

With regard to internal signals in the interface 220, the NFC 222 enables the ECC generator 226 by ECC_START to generate a parity code. ECC_RCE is a chip select signal enabled to read a parity code upon request from the NFC 222. ECCDATAL[7:0], ECCDATAH[7:0], and ECCDTAX[7:0] are signals representing a parity code generated from the ECC generator 226 upon request from the NFC 222.

Aside from the above signals, RBB is a signal representing the status of the NAND flash memory, that is, a ready state or a busy state. The modem 210 is not allowed to access data when the NAND flash memory 232 is busy. In other words, data access is available only when the NAND flash memory 232 is ready. The modem 210 determines the current status of the NAND flash memory 232 by the signal RBB received through a general purpose input/output pin GPIO_INT for interfacing the modem 210 with external devices. RAM_CSB is a chip select signal enabled when the modem 210 accesses the working memory 234. When the NFC 222 does not access the NAND flash memory 232, the signal ROM2_CSB can be connected to RAM_CSB.

Since basic codes for initialization are stored in the mask ROM 224, the modem 210 boots up using the basic codes read from the mask ROM 224 at initial power-on. After initialization, the modem 210 reads OS codes and a call software from the NAND flash memory 232 and copies them in the working memory 234. Then, the modem 210 accesses the working memory 234. The reason for copying data from the NAND flash memory 232 to the working memory 234 is the short access time of an SRAM or UtRAM used as the working memory 234. While the modem 210 directly reads or writes application data from or in the NAND flash memory 232, it can copy the application data in the working memory 234 when necessary.

Figure 3:
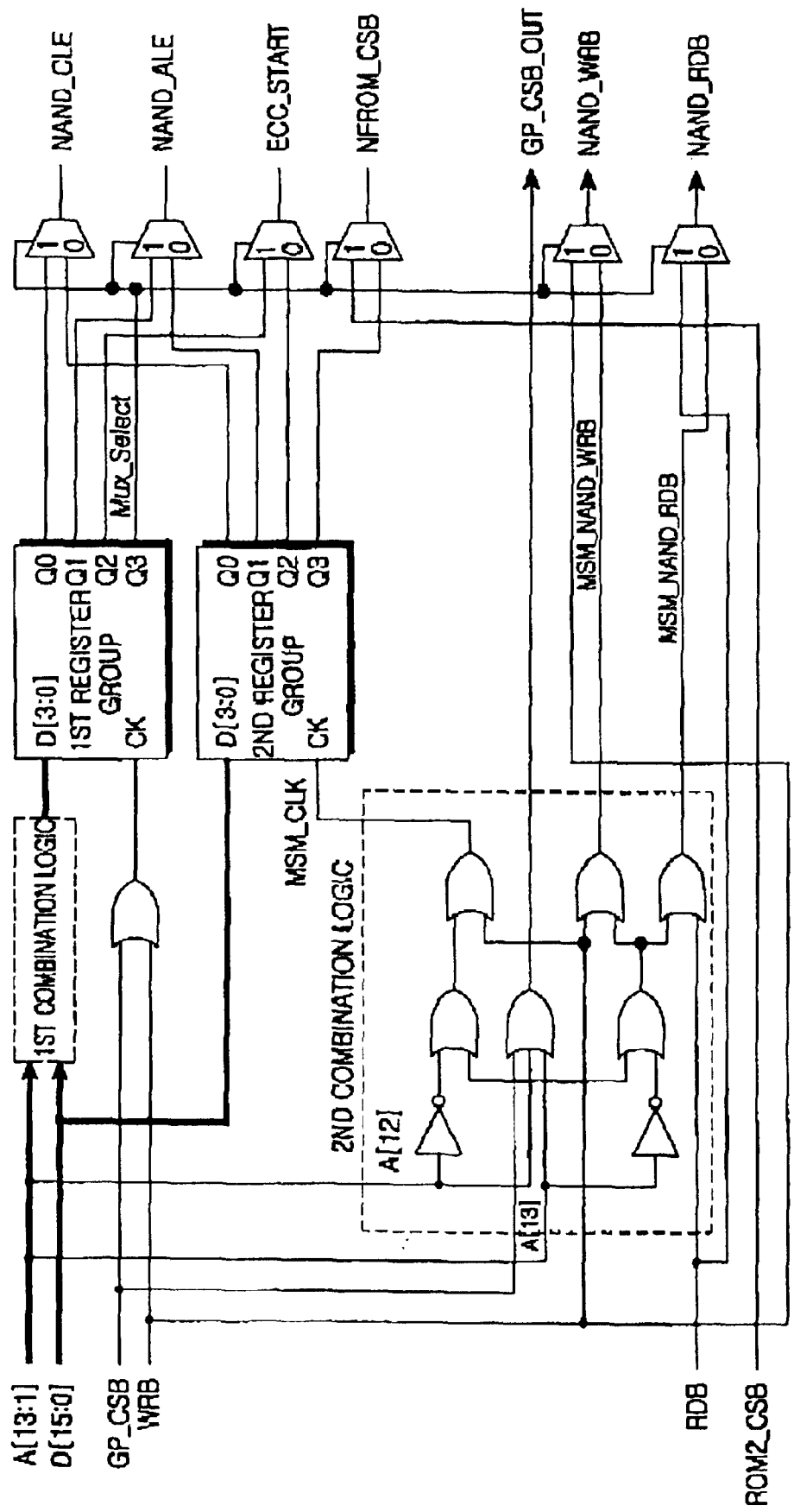
FIG. 3 is a block diagram of an NFC (NAND Flash Controller) illustrated in FIG. 2.

FIG. 3 is a detailed block diagram of the NFC 222 illustrated in FIG. 2. Referring to FIG. 3, when the chip select signal GP_CSB and the write enable signal WRB received from the modem 210 are enabled and a particular address and data are written in the address bus signal A and the data bus signal D, respectively, they control signals output through terminals Q0 to Q4 in a first register group. Mux_Select is output through the terminal Q3. If Mux_Select is set to 0, the signals CLE, ALE, NFROM_CSB, NAND_WRB, and NAND_RDB related with the NAND flash memory 232 and the signal ECC_RCE related with the ECC generator 226 are controlled by a first combination logic and the first register group. On the other hand, if Mux_Select is set to 1, the signals CLE, ALE, NFROM_CSB, NAND_WRB, NAND_RDB, and ECC_RCE are controlled by a second combination logic and a second register group. That is, the NAND flash memory 232 and the ECC generator 226 are controlled by the use of the first combination logic and the first register group, or the second combination logic and the second register group.

A description will be made below of the operation of the interfacing apparatus according to the embodiment of the present invention. The operation can be considered in terms of data writing and data reading in and from the NAND flash memory 232.

Figure 4:
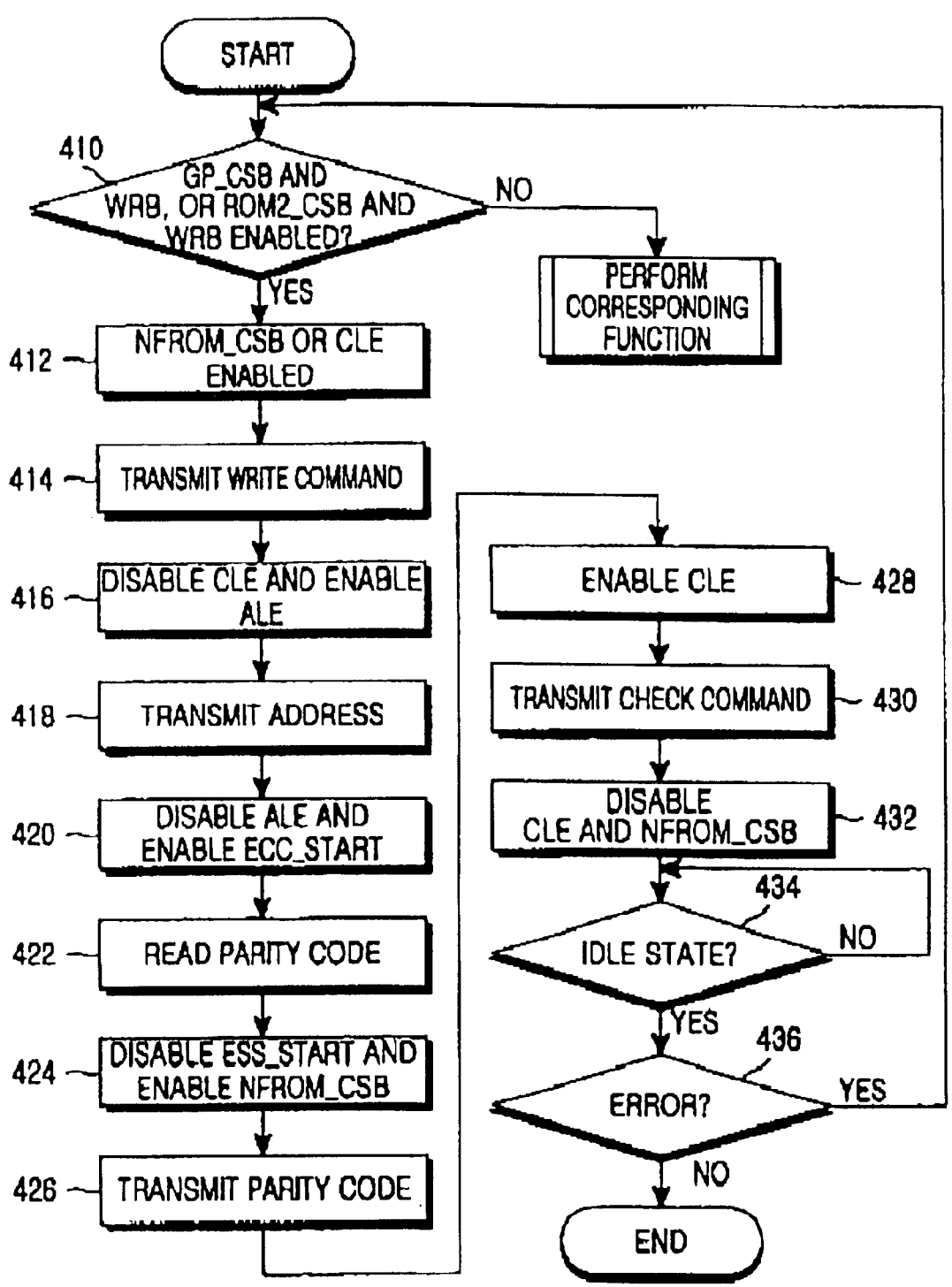
FIG. 4 is a flowchart illustrating data writing from the modem to the memory unit in the MS according to the embodiment of the present invention.
Figure 5:
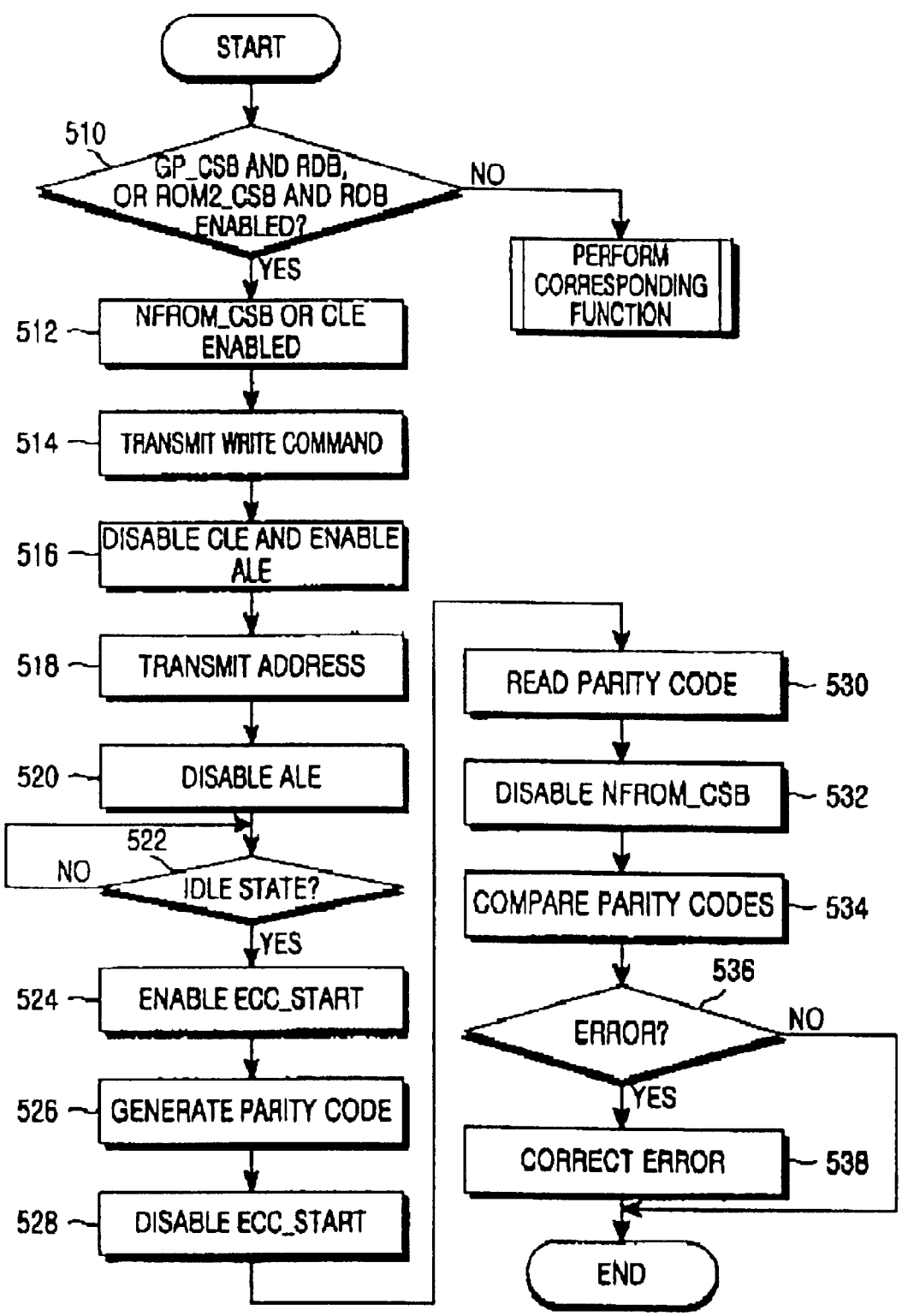
FIG. 5 is a flowchart illustrating data reading from the memory unit to the modem in the MS according to the embodiment of the present invention.

FIGS. 4 and 5 are flowcharts illustrating control operations in the NFC 222 for reading and writing data from and into the NAND flash memory 232, respectively.

Referring to FIG. 4, the NFC 222 receives a data write request from the modem 210 in step 410. The modem 210 requests data writing using the address bus signal A, the data bus signal D, the write enable signal WRB, and the chip select signal GP_CSB or ROM2_CSB.

In step 412, the NFC 222 enables the chip select signal NFROM_CSB for accessing the NAND flash memory 232 and the signal CLE for transmitting a data write command to the NAND flash memory 232. The NAND flash memory 232 is enabled by the NFROM_CSB and prepares for receiving a command from the NFC 222 in response to the signal CLE. The NFC 222 transmits to the NAND flash memory 232 a write command (80H) by the data bus signal D[7:0] in step 414. The NAND flash memory 232 then awaits receipt of an address and data to write. Meanwhile, the NFC 222 disables the signal CLE and enables the signals NFROM_CSB and ALE for accessing the NAND flash memory 232 and transmitting the address, respectively, in step 416.

In step 418, the NFC 222 transmits the address at which data is to be written by the data bus signal D[7:0]. The NFC 222 then disables the signal ALE and enables the signal ECC_START for generating a parity code in the ECC generator 226 in step 420.

The modem 210 transmits intended write data by the data bus signal D[15:0]. The data is written at the designated address in the NAND flash memory 232. The data is also fed to the ECC generator 226 and the ECC generator 226 generates a parity code ECDATAL[7:0], ECDATAH[7:0], and ECDATAX[7:0] for the received data.

The modem 210 enables the signal ECC_RCE through the NFC 222 to read the parity code ECDATAL[7:0], ECDATAH[7:0], and ECDATAX[7:0] in step 422. The NFC 222 disables the signal ECC_START and enables the signal NFROM_CSB to write the parity code in the NAND flash memory 232 in step 424. Subsequently, the modem 210 transmits the parity code by the data bus signal D[7:0] in step 426. The parity code is stored in a predetermined area of the NAND flash memory 232.

The NFC 222 enables the signal CLE in step 428 and transmits a check command (10H) for determining whether the data writing is successful by the data bus signal D[7:0] in step 430. The NFC 222 disables the signal CLE in step 432.

Upon receipt of the check command, the NAND flash memory 232 transmits information about its current status by a data bus signal D[6]. The current status is a busy state or an idle state. Even though it does not receive the check command, the NAND flash memory 232 always reports its current status to the modem 210 by the signal RBB. The NAND flash memory 232 notifies the NFC 222 whether the data writing is successful by a data bus signal D[0].

The modem 210 determines the status of the NAND flash memory 232 by the data bus signal D[6] or RBB in step 434. If the NAND flash memory 232 is in an idle state, the modem 210 determines whether errors have been generated during the data writing by the data bus signal D[0] in step 436. If the data writing is successful, the NFC 222 disables the signal NFROM_CSB and ends the data writing. On the other hand, in the case of a data writing failure, the NFC 222 disables the signal NFROM_CSB and returns to step 410.

Referring to FIG. 5, the NFC 222 receives a data read request from the modem 210 in step 510. The modem 210 requests data reading using the address bus signal A, the data bus signal D, the read enable signal RDB, and the chip select signal GP_CSB or ROM2_CSB.

In step 512, the NFC 222 enables the chip select signal NFROM_CSB for accessing the NAND flash memory 232 and the signal CLE for transmitting a data read command to the NAND flash memory 232. The NAND flash memory 232 is enabled by the NFROM_CSB and prepares for receiving a command from the NFC 222 in response to the signal CLE. The NFC 222 transmits to the NAND flash memory 232 a data read command (00H) by the data bus signal D[7:0] in step 514. The NAND flash memory 232 then awaits receipt of an address. Meanwhile, the NFC 222 disables the signal CLE and enables the signal ALE for transmitting the address in step 516.

In step 518, the NFC 222 transmits the address from which data is to be read by the data bus signal D[7:0]. The NFC 222 then disables the signal ALE in step 520. Upon receipt of the data read command and the address, the NAND flash memory 232 transmits information about its current status by a data bus signal D[6] or the signal RBB. The current status is a busy state or an idle state. In the idle state, the NAND flash memory 232 reads data from the address and transmits it by the data bus signal D[7:0].

The modem 210 determines the status of the NAND flash memory 232 by the data bus signal D[6] or the signal RBB in step 524. If the NAND flash memory 232 is in an idle state, the modem 210 enables the signal ECC_START for generating a parity code for the read data in step 524. The ECC generator 226 generates a parity code ECCDATAL[7:0], ECCDATAH[7:0], and ECCDATAX[7:0] for the read data.

The modem 210 reads the parity code from the ECC generator 226 by enabling the signal ECC_RCE through the NFC 222 in step 526 and disables the signal ECC_START through the NFC 222 in step 528. In step 530, the modem 210 reads a parity code corresponding to the read data from the NAND flash memory 232. Then the modem 210 disables the signal NFROM_CSB in step 532.

The modem 210 compares the generated parity code with the read parity code in step 534 and determines whether the read data has errors according to the comparison result in step 536. If the parity codes are different, the modem 210 determines that the read data has errors. If they are identical, the modem 210 determines that no errors are in the read data.

If the modem 210 determines that the read data has no errors in step 536, it ends the data reading operation, and otherwise, it corrects errors in step 538 and ends the data reading operation.

As described above, data is written in a data area of the NAND flash memory 232. For the data writing, the ECC generator 226 generates a parity code for the data. The modem 210 writes the parity code in the NAND flash memory 232. In a data reading operation, data read from the NAND flash memory 232 is fed to the ECC generator 226. The ECC generator 226 generates a new parity code for the read data. The modem 210 compares the new parity code with a parity code corresponding to the read data, as stored in the NAND flash memory 232. According to the comparison result, the modem 210 determines whether the read data has errors. If it does, the errors are corrected.

Meanwhile, when power is initially on, the modem 210 reads the basic codes from the mask ROM 224 to perform initialization. The initialization operation will be described with reference to FIG. 2.

At initial power-on, the modem 210 enables the chip select signal ROM1_CSB to access the mask ROM 224. The mask ROM 224 is enabled by ROM1_CSB and awaits a command from the modem 210. The modem 210 provides the mask ROM 224 with an address at which the basic data is stored by the address bus signal A[13:1]. Then the mask ROM 224 reads the basic codes at the address and transmits them by the data bus signal D[15:0]. The modem 210 performs initialization according to the basic codes.

As stated before, the modem 210 copies data read from the NAND flash memory 232 in the working memory 234, for fast access.

To do so, the modem 210 enables the chip select signal RAM_CSB to access the working memory 234 via terminal CE1. If the modem 210 does not access the NAND flash memory 232, the signal ROM2_CSB can be used instead of the signal RAM_CSB. The working memory 234 is activated by the signal RAM_CSB and awaits receipt of a command from the modem 210. When the modem 210 intends to copy OS codes and a call software read from the NAND flash memory 232 in the working memory 234, it enables the write enable signal WRB. On the contrary, to read the OS codes and the call software from the working memory 234, the modem 210 enables the read enable signal RDB. The signal WRB is fed to the working memory 234 through a terminal OE and the signal RDB, to the working memory 234 through a terminal WE. When the terminal OE is enabled, the working memory 234 awaits receipt of an address and data such as OS codes, a call software, etc. from the modem 210. The working memory 234 receives the address by an address bus signal[21:1] and data by the data bus signal[15:0], and writes the data at the address.

If the working memory 234 is activated and then the terminal WE is enabled, the working memory 234 awaits receipt of an address from the modem 210. Upon receipt of the address by the address bus signal[21:1], it reads data at the address and transmits it to the modem 210 by the data bus signal D[15:0].

Referring back to FIG. 3, for the input of signals from the modem 210, A[13:1], D[15:0], GP_CSB, WRB, RDB, and ROM2_CSB, the NFC 222 outputs signals required for data writing or data reading in or from the NAND flash memory 232, CLE, ALE, ECC_RCE, NFROM_CSB, GP_CSB_OUT, NAND_WRB, and NAND_RDB.

The signals GP_CSB and WRB are fed to a terminal CK of the first register group through an AND gate. The first register group outputs the signal Mux_Select through the terminal Q3 as an enable signal for multiplexers (MUXes) that multiplex the signals CLE, ALE, ECC_RCE, NFROM_CSB, GP_CSB_OUT, NAND_WRB, and NAND_RDB. The first register group controls the signals CLE, ALE, ECC_RCE, and NFROM_CSB according to the signals A[13:0] and D[15:0] using the first combination logic. Signals A[12], and A[13] and the chip select signal GP_CSB are applied to the input of a second combination logic. The second combination logic generates the signals CLE, ALE, ECC_RCE, and NFROM_CSB. The signal GP_CSB_OUT is used as an interface signal for the NAND flash memory 232 or an LCD module (not shown). When the signal GP_CSB is enabled and both signals A[10] and A[13] are 1, the signal GP_CSB_OUT is enabled and used as a chip select signal.

Figure 6:
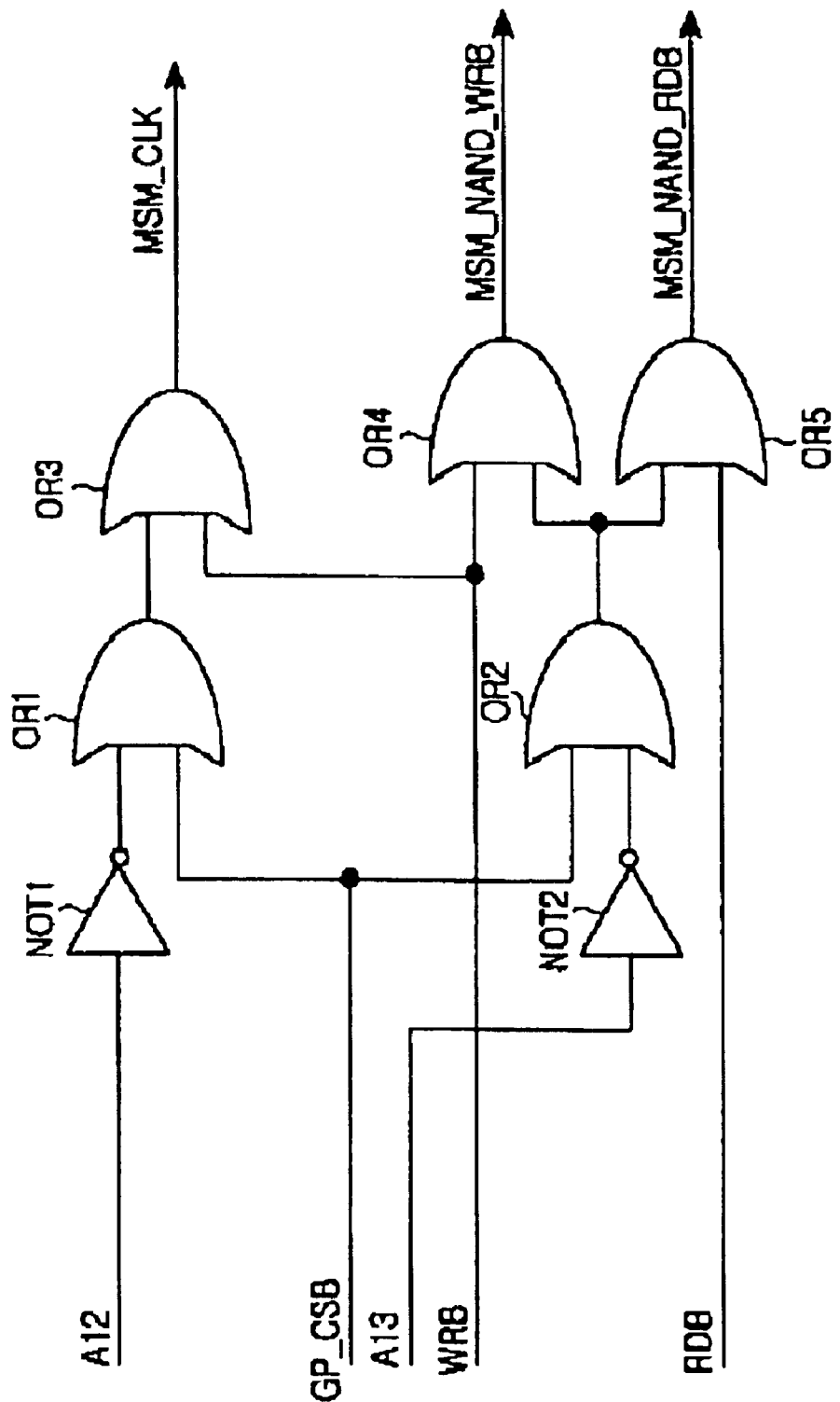
FIG. 6 illustrates part of a combination logic illustrated in FIG. 3.

FIG. 6 illustrates the second combination logic illustrated in FIG. 3. Referring to FIG. 6, the combination logic is constructed in the form of a flipflop (F/F). A first inverter NOT1 inverts an address signal A[12]. A first OR gate OR1 OR-gates the output of the first inverter NOT1 and the chip select signal GP_CSB. A third OR gate OR3 OR-gates the output of the first OR gate OR1 and the write enable signal WRB. The output of the third OR gate OR3 is fed as a clock signal MSM_CLK to the register group.

A second inverter NOT2 inverts an address signal A[13]. A second OR gate OR2 OR-gates the output of the second inverter NOT2 and the chip select signal GP_CSB. A fourth OR gate OR4 OR-gates the output of the second OR gate OR2 and the write enable signal WRB. A fifth OR gate OR5 OR-gates the output of the second OR gate OR2 and the read enable signal RDB. The outputs of the fourth and fifth OR gates OR4 and OR5 become a NAND flash memory write signal NAND_WRB and a NAND flash memory read signal NAND_RDB, respectively.

Figure 7:
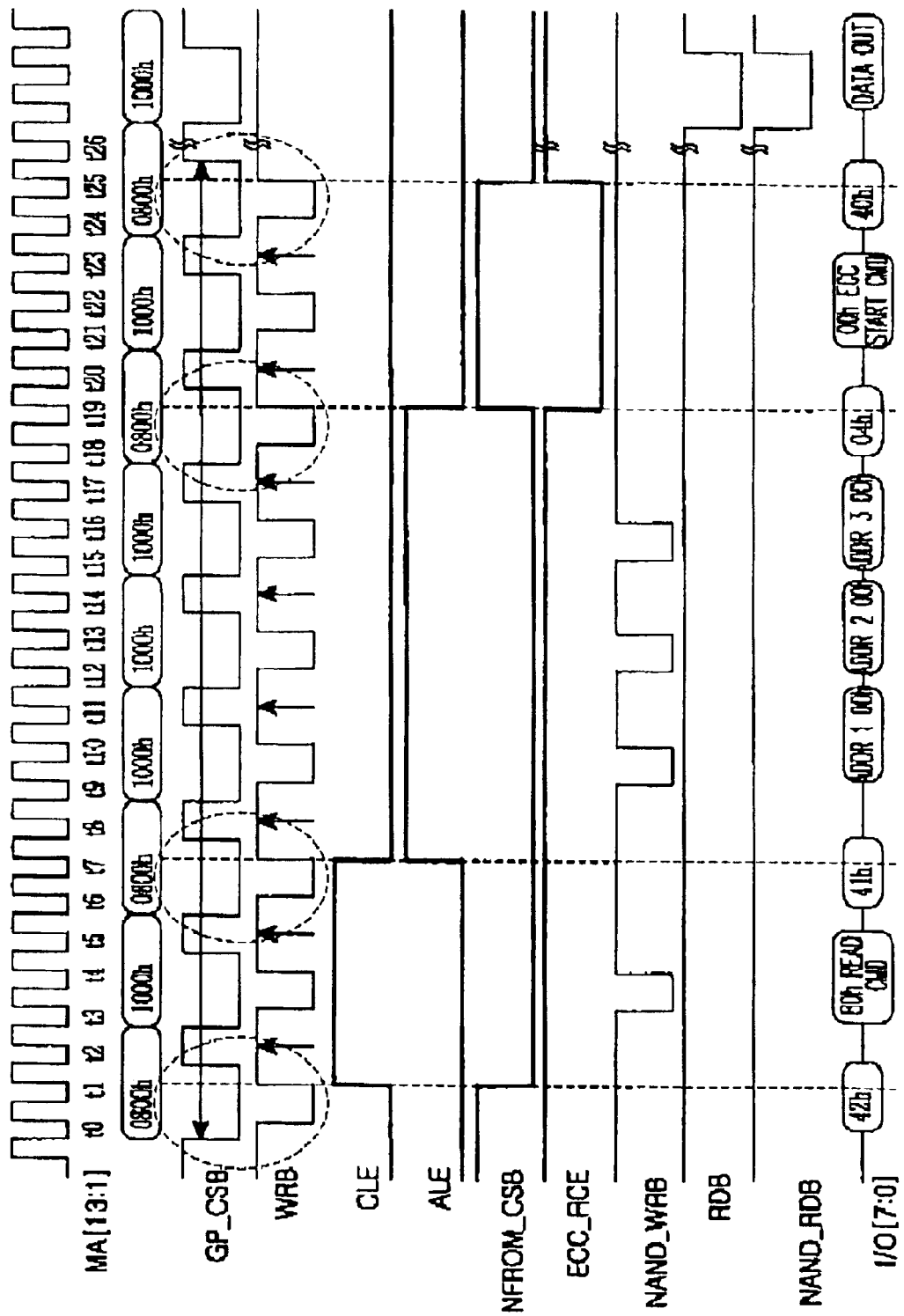
FIG. 7 is a timing diagram for an interfacing apparatus having the combination logic illustrated in FIG. 6.

FIG. 7 is a timing diagram for the NFC 222 having the combination logic illustrated in FIGS. 3 and 6. With reference to FIG. 7, the timings of read and write signals will be described.

When data writing is requested, the chip select signal GP_CSB is enabled low at time t0. The signal WRB is enabled low for one clock period from the falling edge of time t1. This corresponds to transition from step 410 to step 412 in FIG. 4, or from step 510 to step 512 in FIG. 5. That is, step 410 or 510 is satisfied since the signals GP_CSB and WRB are enabled. At time t2, the signal CLE is enabled high and the signal NFROM_CSB is transitioned to be low. That is, step 412 or 512 is performed. Then between the falling edge of time t1 and the falling edge of time t7, a read command or a write command is output as an interface output I/O, as in step 414 or 514. After the read command or the write command is output, the signals CLE and ALE for enabling transmission of the commands are both disabled at the falling edge of time t7.

Then, a read address or a write address is output. The ECC generator 226 must be activated before writing data or reading data because of high error rate during data writing or data reading in or from the NAND flash memory.

To transmit a start command to the ECC generator 226, the signal GP_CSB is enabled at the rising edge of time t8 and the signal WRB is enabled at the falling edge of time t19. Therefore, at the falling edge of time t19, the signal NFROM_CSB transitions from low to high and the signal ECC_RCE transitions from high to low. Thus from time t20 to time t25, the start command is delivered to the ECC generator 226. Then, a data read command or a data write command is executed.

As noted from FIG. 7, two clock pulses are lost before and after delivering a command signal, respectively. It is because after the write clock signal MSM_CLK is generated using the address signal A[12] and the signal GP_CSB, it acts as a flipflop clock signal and thus produces the signals ALE, CLE, NFROM_CSB, and ECC_RCE according to input data. In addition, with the address signal A[13] and the signal GP_CSB, the signals NAND_WRB and NAND_RDB are generated. Thus, the two-clock pulse loss occurs before and after transmission of each command.

Figure 8:
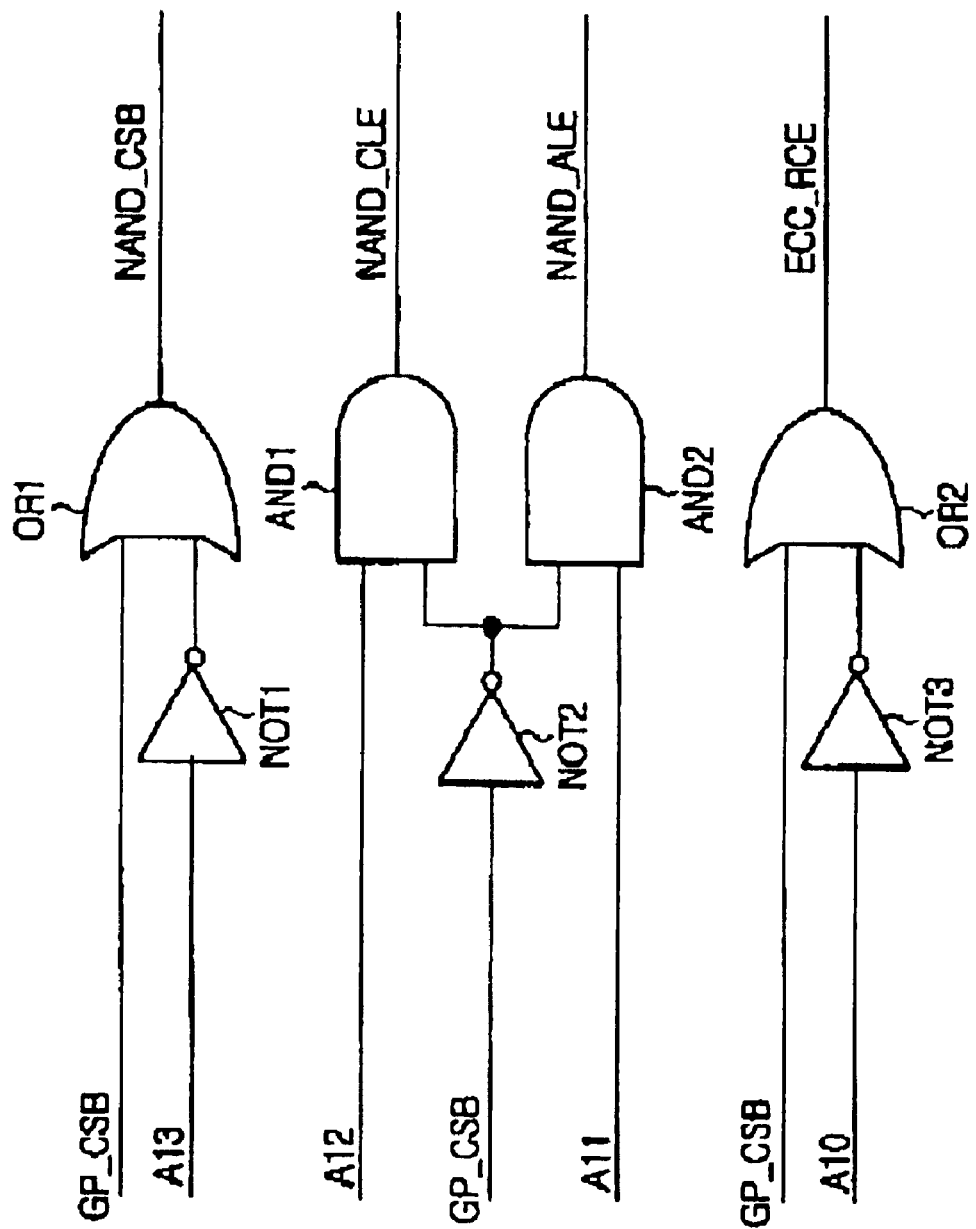
FIG. 8 is a detailed circuit diagram of another embodiment of the combination logic.

FIG. 8 is a detailed circuit diagram of another embodiment of the combination logic according to the present invention. Referring to FIG. 8, the chip select signal GP_CSB is fed to a first OR gate OR1, a second OR gate OR2, and a second inverter NOT2. The second inverter NOT2 inverts the signal GP_CSB. A first AND gate AND1 AND-gates the address signal A[12] and the output of the second inverter NOT2 and outputs a signal NAND_CLE. A second AND gate AND2 AND-gates the address signal A[11] and the output of the second inverter NOT2 and outputs a signal NAND_ALE.

Meanwhile, a first inverter NOT1 inverts the address signal A[13]. The first OR gate OR1 OR-gates the signal GP_CSB and the output of the first inverter NOT1 and outputs a signal NAND_CSB. The second OR gate OR2 OR-gates the signal GP_CSB and the address signal A[10] inverted in a third inverter NOT3 and outputs a signal ECC_RCE.

Figure 9:
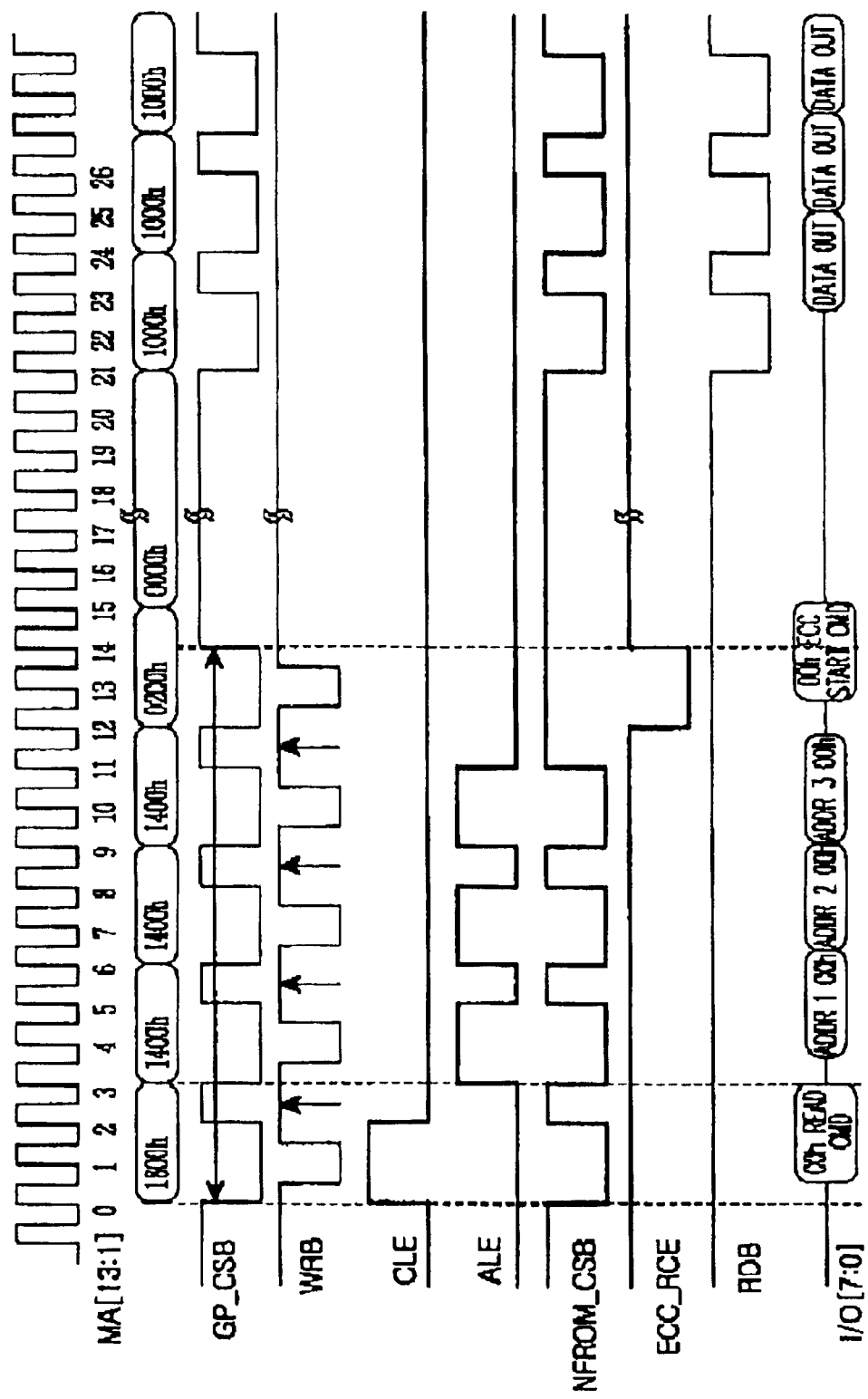
FIG. 9 is a timing diagram for signals input to an ECC (Error Correction Code) generator when the combination logic illustrated in FIG. 8 is used.

FIG. 9 is a timing diagram for signals input to the ECC generator 226 in the interface 220 having the combination logic illustrated in FIG. 8.

As compared to the signal timings illustrated in FIG. 7, no two-clock delay occurs before and after delivery of a command signal utilizing the property of the signal GP_CSB. That is, it is because the signals ECC_RCE, ALE, CLE, and NFROM_CSB are generated using signal pairs of GP_CSB and A[12], and GP_CSB and A[13], and this combination logic does not utilize a flipflop.

In accordance with the present invention as described above, a high-capacity, cheap NAND flash memory substitutes for a NOR flash memory that imposes constraints in terms of cost, capacity, and supply in an MS. Therefore, the MS is improved in cost and performance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A circuit incorporating NAND flash memory having a plurality of input and output pins and having first addresses, for storing information required for the operation of an object, receiving a read command and an address, and outputting information stored at the address, the circuit comprising:

a working memory having a capacity smaller than the capacity of the NAND flash memory, for copying part of the information stored in the NAND flash memory therein and having second addresses different from the first addresses of the NAND flash memory;

a programmable memory for having basic codes required to copy the part of the information stored in the NAND flash memory to the working memory; and a controller connected to the programmable memory, for controlling random reading of the information stored in the working memory using the second addresses.

2. The circuit of claim 1, wherein the controller reads the basic codes from the programmable memory and copies the part of the information stored in the NAND flash memory in the working memory at an initial operation.

3. The circuit of claim 1, further comprising an error correction code generator for generating an error correction code for data to be written or read and outputting the error correction code to the controller.

4. The circuit of claim 3, wherein the controller controls the error correction code generator to generate an error correction code and controls the NAND flash memory to store the error correction code at an address different from an address for data when the data is written to the NAND flash memory.

5. The circuit of claim 3, wherein when data is read, the controller controls the error correction code generator to generate an error correction code, reads an error correction code stored at a different address from the data in the NAND flash memory, compares the generated error correction code with the read error correction code, and determines whether the read data has errors according to the comparison.

6. The circuit of claim 1, wherein the basic code consists of a vector table, boot code and load code.

7. An apparatus for interfacing between a NAND flash memory for storing data and a modem for processing data to be written in the NAND flash memory, comprising:

a memory controller for controlling data received from the modem and an error correction code to be written in the NAND flash memory when a chip select signal and a write command are enabled;

a mask ROM (Read Only Memory) activated by the modem, for outputting basic codes required for initialization upon receipt of a read command from the modem at initial power-on; and an error correction code generator activated by the memory controller, for generating an error correction code for data received from the modem and outputting the error correction code to the modem through the memory controller.

8. The apparatus of claim 7, further comprising an error correction code generator activated by controlling of the memory controller, for providing the error correction code to modem through the memory controller.

9. The apparatus of claim 7, further comprising a working memory activated by the modem, for receiving part of data stored in the NAND flash memory that requires fast access from the modem and outputting the data to the modem under the control of the memory controller.

* * * * *